(No Model.)

J. O. RENNER & N. BOWERS.
TOBACCO STICK.

No. 438,445. Patented Oct. 14, 1890.

WITNESSES:
Fred G. Dieterich
P. B. Turpin

INVENTOR:
Joseph O. Renner
Noah Bowers
BY Munn & Co
ATTORNEYS

UNITED STATES PATENT OFFICE.

JOSEPH O. RENNER AND NOAH BOWERS, OF GREENEVILLE, TENNESSEE.

TOBACCO-STICK.

SPECIFICATION forming part of Letters Patent No. 438,445, dated October 14, 1890.

Application filed June 18, 1890. Serial No. 355,870. (No model.)

*To all whom it may concern:*

Be it known that we, JOSEPH O. RENNER and NOAH BOWERS, of Greeneville, in the county of Greene and State of Tennessee, have invented a new and useful Improvement in Tobacco-Sticks, of which the following is a specification.

This invention is an improved tobacco-stick for use in drying and curing the leaves of tobacco; and the invention consists in certain novel constructions and combinations of parts, as will be hereinafter described, and pointed out in the claim.

Figure 1:
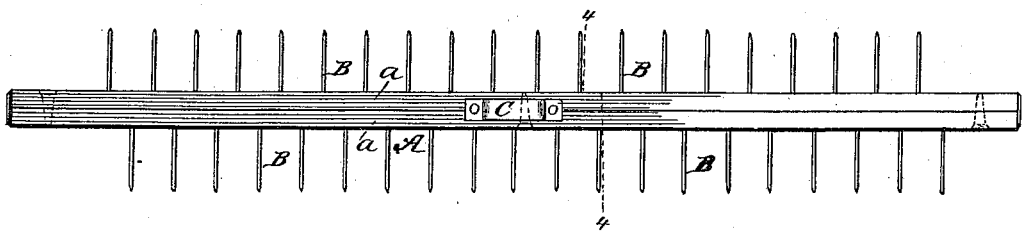
Figure 2:
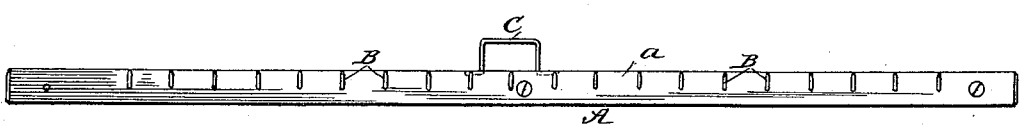
Figure 3:
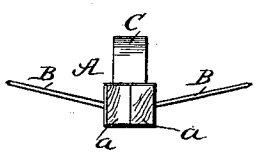
Figure 4:
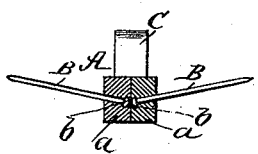

In the drawings, Figure 1 is a top plan view, Fig. 2 a side view, Fig. 3 an end view, of the improved stick; and Fig. 4 is a cross-section on about line 4 4 of Fig. 1.

The improved device consists of the stick proper A, the hangers or hooks B, and the loop C, by which the stick may be readily suspended. The hooks B alternate on opposite sides of the stick, so that the leaves on each side will hang in a line between the leaves on the opposite side of the stick. The stick A is made in two longitudinal sections $a$ $a$ secured together, the hooks on each side being passed through the section $a$ at such side and having at their inner ends heads $b$, which are held between the sections $a$ when the latter are secured together, so that the hooks will be prevented from becoming loose and detached. We make these hooks in the form of pins or pricks inclining upward from the supporting-stick toward their outer ends, so that the leaves when slipped thereon will be properly held, as desired.

By the relative arrangement of the hooks, as shown, the leaves are so held as to be quickly and evenly cured.

In practice we make the sticks in three different lengths—three, four, and five feet; but manifestly their lengths may be varied without departing from the principles of the invention.

As before suggested, each of the sections $a$ $a$ serves to secure the pins or hooks of the other from displacement; but in addition to such result we secure an important advantage by making the stick in two sections and by the alternate arrangement of the pins, as shown, because on the cross-sectional line on which one of the sections $a$ is weakened the other section is imperforate and of full strength, so that each of the sections serves to re-enforce or brace the other and to render the stick proper strong and durable.

Having thus described our invention, what we claim as new is—

The improved tobacco-stick herein described, consisting of the stick proper formed of longitudinal sections secured together and the hooks or pins provided with heads and passed outward through such sections, whereby each section serves to secure the hooks or pins of the other section from displacement, the pins or hooks of each section being arranged to alternate with those of the other, whereby each section will have a strong imperforate portion in cross-sectional line with the hook or pin of the other, substantially as set forth.

JOSEPH O. RENNER.
NOAH BOWERS.

Attest:
W. E. F. MILBURN,
W. T. MITCHELL.